(12) United States Patent
Yasukura

(10) Patent No.: US 7,038,331 B2
(45) Date of Patent: May 2, 2006

(54) AUTOMOBILE OPERATING KEY AND ELECTRONIC CONTROL DEVICE DORE AUTOMOBILES

(76) Inventor: Yutaka Yasukura, 11-13-506, Hatagaya-1 chome, Shibuya-ku, Tokyo-to 151-0072 (JP)

( * ) Notice: Subject to any disclaimer, the term of this patent is extended or adjusted under 35 U.S.C. 154(b) by 329 days.

(21) Appl. No.: 10/471,408

(22) PCT Filed: Mar. 11, 2002

(86) PCT No.: PCT/JP02/02233

§ 371 (c)(1),
(2), (4) Date: Sep. 11, 2003

(87) PCT Pub. No.: WO02/072396

PCT Pub. Date: Sep. 19, 2002

(65) Prior Publication Data
US 2004/0083033 A1 Apr. 29, 2004

(30) Foreign Application Priority Data
Mar. 14, 2001 (JP) ............................... 2001-71510

(51) Int. Cl.
*B60R 25/00* (2006.01)
(52) U.S. Cl. .................... 307/10.2; 340/5.1; 340/5.23
(58) Field of Classification Search ............... 307/10.2; 340/5.1, 5.23
See application file for complete search history.

(56) References Cited

U.S. PATENT DOCUMENTS

| | | | |
|---|---|---|---|
| 4,789,859 A | * | 12/1988 | Clarkson et al. ........... 340/5.65 |
| 4,929,880 A | * | 5/1990 | Henderson et al. ......... 320/134 |
| 5,552,789 A | * | 9/1996 | Schuermann ............... 340/5.21 |
| 6,237,786 B1 | * | 5/2001 | Ginter et al. ................ 213/153 |
| 6,337,812 B1 | * | 1/2002 | Tokito et al. .......... 365/189.05 |

FOREIGN PATENT DOCUMENTS

| | | |
|---|---|---|
| EP | 0456916 | 11/1991 |
| EP | 1193666 | 4/2002 |
| FR | 2 767 853 A1 * | 9/1997 |
| GB | 2252847 | 8/1992 |
| JP | 04-50475 A | 2/1992 |
| JP | 08-238951 | 9/1996 |
| JP | 2000-352245 | 12/2000 |
| WO | WO 99/23539 | 5/1999 |
| WO | WO 00/45358 | 8/2000 |

* cited by examiner

Primary Examiner—Lynn Feild
Assistant Examiner—Michael Rutland-Wallis
(74) Attorney, Agent, or Firm—Fleshner & Kim, LLP

(57) ABSTRACT

Some of the pieces of divisional electronic information formed by dividing an electronic control program for an automobile are stored in an automobile operating key, the rest being stored in a car-mounted storage unit, and the pieces of divisional electronic information read in from the operating key and the pieces of divisional electronic information read out of the car-mounted storage unit are united by an electronic information integration restoration device to restore the electronic control program, whereby the automobile is driven. An automobile electronic control device of high safety which prevents the driving of the automobile unless a genuine key is used by utilizing a digital control system, a key mechanism using the same and methods thereof are provided.

2 Claims, 2 Drawing Sheets

$Cm = F(Ar1, Ar2, Ds, Ct)$

AUTOMOBILE OPERATING KEY AND ELECTRONIC CONTROL DEVICE DORE AUTOMOBILES

This application claims priority to PCT/JP02/02233, filed Mar. 11, 2002, published on Sep. 19, 2002, Publication No. WO 02/072396 A1 in the Japanese language and which claimed priority to JP2001-71510, filed Mar. 14, 2001.

FIELD OF THE INVENTION

The present invention relates to a control key for operating an automobile and an electronic control device therefor, especially to an automobile operating key allowing only a justified owner to drive the automobile and an electronic control device to control the starting and driving of the automobile.

BACKGROUND ART

An automobile is provided with a specific key, so that the automobile is prevented from being stolen by operating by a stranger who does not have the specific key.

However, since a conventional automobile operating key serves also as an ignition key, the locking can be released by either of a master key and a duplicated key which coincides with its specific keyway. Moreover, in the case that its key mechanism serves also as an ignition key, an automobile can be started also by direct connection of the wiring.

On the other hand, in recent years, an electronic engine control system using an electronic control unit has increasingly been used for an automobile. The automobile electronic control system has been developed not only for controlling a fuel injection device and an ignition device, but has also been under development into a more comprehensive electronic control system by adding other functions such as an idling speed control, an electronic throttle control, a supercharged pressure control by electronic control, an antilock system, a braking system, a traction control, a self-diagnosis, and further, other functions such as automatic driving, an electronic toll paying function, information collection by connecting to the Internet, and a navigation function using GPS.

The electronic control system comprises sensors arranged at various positions on an automobile, actuators for operating the states of the automobile, and an electronic control unit (ECU). The ECU comprises an input device for receiving outputs from the sensors, a microcomputer, and an output driving part. The microcomputer is comprised of ROM for storing a program incorporating control sequences and logics, EPROM for pre-recording an ignition characteristic map or the like to be used for control, RAM for storing data to be updated as necessary, and an arithmetic operation unit.

Nowadays, an automobile using an electronic control system cannot move at all without operation of the control system.

For some of the automobiles using such an electronic control unit, a car drive disable device (immobilizer) by the electronic control unit is adopted. The immobilizer is automatically activated after turning off an ignition switch to disable at least one of the devices essential to driving the vehicle such as a starter motor circuit, a fuel supply circuit, and an ignition circuit from operating. The circuits for driving the devices are activated by inserting a specific electronic key or inputting a predetermined code through a code keypad.

A conventional immobilizer releases a drive disable state of the car by the same manner, because the immobilizer manages operation of a driving circuit which is completely built in an automobile control device. Therefore, for example, if stealing the cipher code, even a stranger can easily unlock the state.

DISCLOSURE OF THE INVENTION

Therefore, the purpose of the present invention is to provide an automobile electronic control device improved in safety and a key mechanism used therefor, by preventing an automobile from being driven without using a genuine key under an electronic control system.

In an automobile arranged so as to be started by storing some of the pieces of divisional electronic information formed by dividing an electronic control program for an automobile in an automobile operating key, storing the rest in a car-mounted electronic control unit, and uniting both divisional electronic information, the electronic control device of the present invention is characterized in that it is provided with a reader for reading the divisional electronic information stored in the automobile operating key, a writable car-mounted storage unit for recording the rest of the divisional electronic information stored in the automobile operating key, and an electronic information integration restoration device for restoring the control program by uniting the divisional electronic information inputted from the automobile operating key and the divisional electronic information stored in the car-mounted storage unit; and operating the automobile according to the restored control program.

Further, the automobile electronic control device of the present invention is characterized in being provided with an electronic tally device for dividing an electronic program and forming more than one of divisional electronic information, and a write device capable of writing the divisional electronic information in the automobile operating key, so as to newly divide the control program into more than one of divisional electronic information when ending the driving of the automobile, making the writing device write at least one piece of divisional electronic information in the above-mentioned automobile operating key, and letting the storage unit store the rest of the divisional electronic information therein.

Moreover, in order to solve the above problems, the automobile operating key of the present invention is characterized in being provided with a readable storage unit for inputting and storing at least one piece of more than one of the divisional electronic information formed by dividing the electronic control program.

An authenticated driver's ID or biological features such as fingerprints and voiceprints may divisionally be stored as an authentication information. Further, the performance data of the vehicle, or the like may additionally be considered.

In the electronic control device of the present invention, the control program stored in the car-mounted storage unit lacks the part stored in the automobile operating key, therefore, it is impossible to operate the automobile only with the contents of the storage of the automobile itself. The automobile cannot be operated until the electronic information stored in the automobile operating key is read out and united with the electronic information stored in the car-mounted storage unit.

Therefore, unless a key storing exactly the same electronic information is used, the electronic control device cannot be operated even if the encrypted code or the like is used by theft.

Moreover, theft by a stranger can strictly be prevented if authentication information of authorized drivers is additionally used.

Since there are almost infinitely various ways for dividing a piece of an electronic control program, it is very easy to store different electronic information for each automobile operating key. Moreover, if the storage unit on the automobile is made to store only the electronic information other than the part stored in the automobile operating key, the automobile and the key have a complementary relationship with each other, and so both are made to peculiarly correspond to each other.

Further, since the electronic control program is newly divided every time after a drive and is partly stored in the automobile operating key and the rest is stored in the storage unit on the automobile, a new different key is to be created at the time. Therefore, even if a stranger reads out the contents of the storage of the key and duplicates them, it is impossible for him/her to use the duplicated key after the owner once drives the automobile, because the contents of the storage are changed thereafter.

Moreover, the automobile operating key of the present invention may be formed like an IC memory card. Further, the automobile may be arranged not to be started immediately after reading the contents of the storage in the key, but to be started by key operation or separate switch operation after having completed the control program by compensating the electronic information read from the key.

BEST MODE FOR CARRYING OUT THE INVENTION

Figure 1:
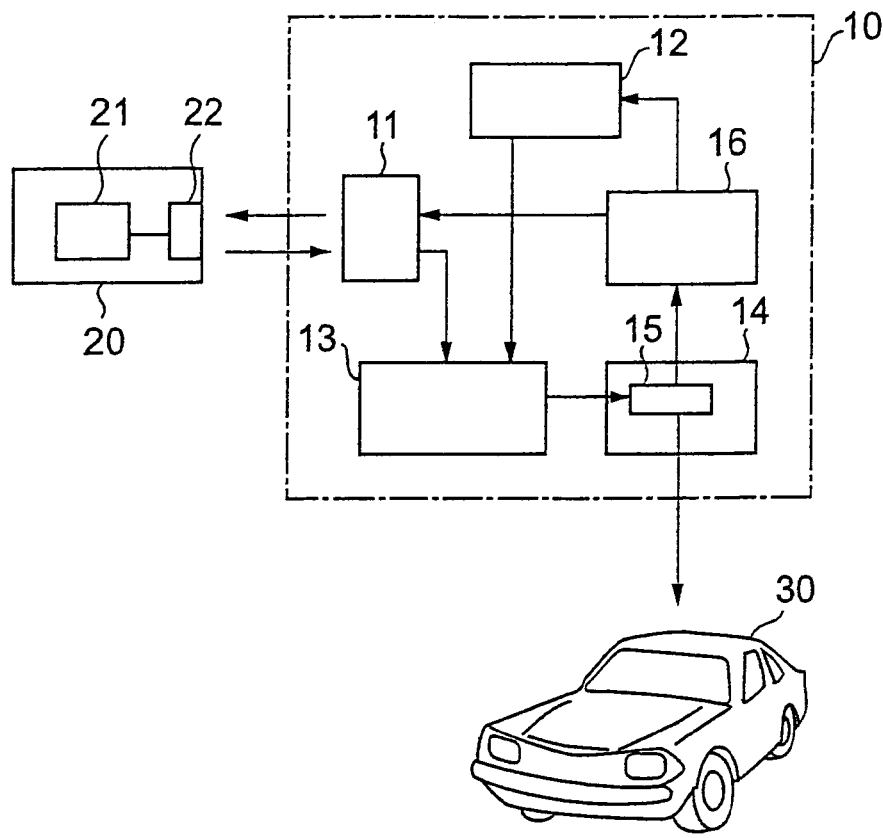
FIG. 1 is a block diagram showing the configuration of one embodiment of the automobile electronic control device in accordance with the present invention.

As shown in FIG. 1, the electronic control device 10 of this embodiment is mounted on the automobile 30, and is, for example, a comprehensive electronic control device for performing control of the fuel injection device and the ignition unit of the automobile 30, an idling speed control, electronic throttle control, supercharged pressure control by electronic control, an anti-lock system control, braking system control, traction control, self-diagnosis, or the like.

The electronic control device 10 is provided with a reader 11 for reading in the electronic information stored in the automobile operating key 20, a writable storage unit (RAM) 12 for storing the electronic information, an electronic information integration restoration device 13 for restoring by integrating the electronic information stored in the automobile operating key 20 with the electronic information stored in the RAM 12, an automobile operating unit 14 for controlling the automobile 30 by installing the computer program 15 brought by the restored electronic information, and an electronic tally device 16 for dividing the computer program 15 into electronic tallies at the end of driving of the automobile.

The automobile operating key 20 has a built-in writable storage unit (RAM) 21, and for example, it can be formed of an IC card. The electronic information to be sent to the electronic control device 10 on the automobile 30 via the input/output terminals 22 is stored in the RAM 21.

Moreover, the automobile operating key 20 is able to store the electronic information sent from the electronic control device 10 via the input/output terminals 22.

Figure 2:
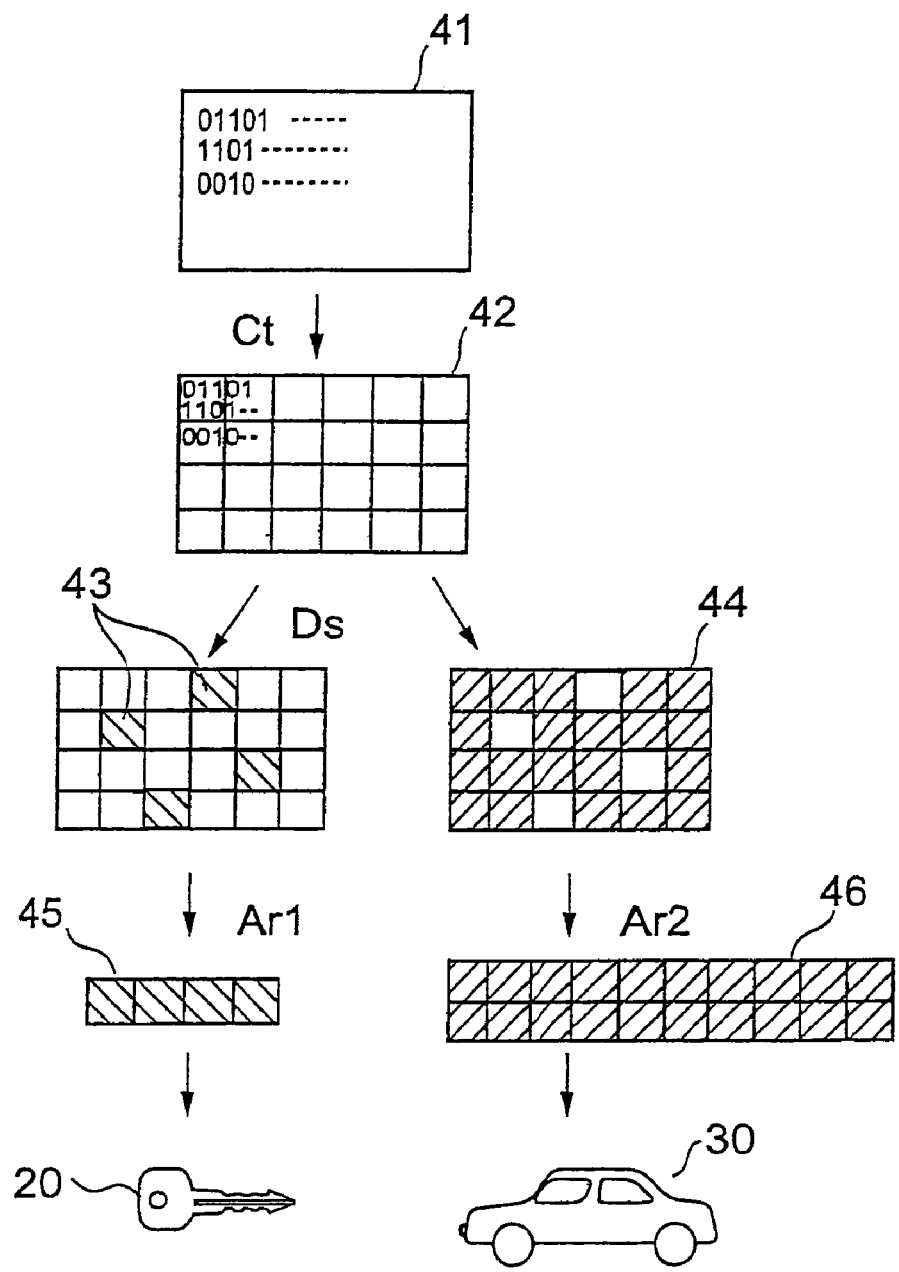
FIG. 2 is a flow diagram for explaining an example of the divisional distribution method of the control program.

FIG. 2 is a flow diagram for explaining a procedure for dividing the control program between the automobile operating key 20 and the electronic control device 10 by the electronic tally device 16 at the end of driving.

As shown in FIG. 2, the control program 41 is expressed as electronic information enumerating the digits of 0 and 1. These are subdivided according to an arbitrarily specified distribution algorithm Ct. The subdivided electronic information elements 42 are formed into sets of digital numbers parted at an appropriate position. Each electronic information element does not need to be the same in size.

Further, according to an arbitrarily selected distribution algorithm Ds, some pieces 43 of the subdivided electronic information elements are selected and distributed to the side of the automobile operating key 20, and the other pieces 44 are distributed to the side of the automobile 30.

The electronic information elements 43 distributed to the side of the automobile operating key 20 are reshuffled and rearranged according to an arbitrarily specified arrangement algorithm Ar1, and are stored in the storage unit of the automobile operating key 20 as tally electronic information for key storage 45. The automobile operating key 20 may be formed into a conventional shape key with a built-in storage unit, while it may be an IC card.

On the other hand, the electronic information elements 44 distributed to the automobile side are reshuffled and rearranged according to an arbitrarily specified arrangement algorithm Ar2, and are recorded in the writable storage unit 12 in the electronic control device mounted on the automobile 30 as tally electronic information for automobile storage 46. At the same time, the distribution algorithm Ct, the distribution algorithm Ds, and the arrangement algorithms Ar1, Ar2 are stored in the storage unit 12.

Thereafter, the original electronic control program 41 is deleted from the electronic control device 10.

A conventional immobilizer keeps the control algorithm in the complete state on the automobile, therefore, if only the means for making secret like a password or the like can be used by theft, the driving becomes possible by using the correct control algorithm.

However, with the system according to this embodiment, only a part of the control algorithm for driving the automobile 30 is present inside of the automobile after ending the driving of the automobile.

Therefore, a stranger without the automobile operating key 20 cannot drive the automobile. Moreover, even if the stranger can steal the information stored in the automobile operating key 20, the stranger neither can divide the information into meaningful parts, nor can the stranger know where to apply each part to the control algorithm.

Further, every time the driving of the automobile is ended, the electronic information is newly divided into electronic tallies and distributed to the key and the vehicle, therefore, even if a stranger steals the information from the key and duplicates it, the duplicated information is useless and the vehicle is safe if the vehicle owner drives his/her vehicle once before the stranger uses the duplicated information.

Thus, compared with a conventional system, the system of this embodiment is able to secure much higher safety.

Figure 3:
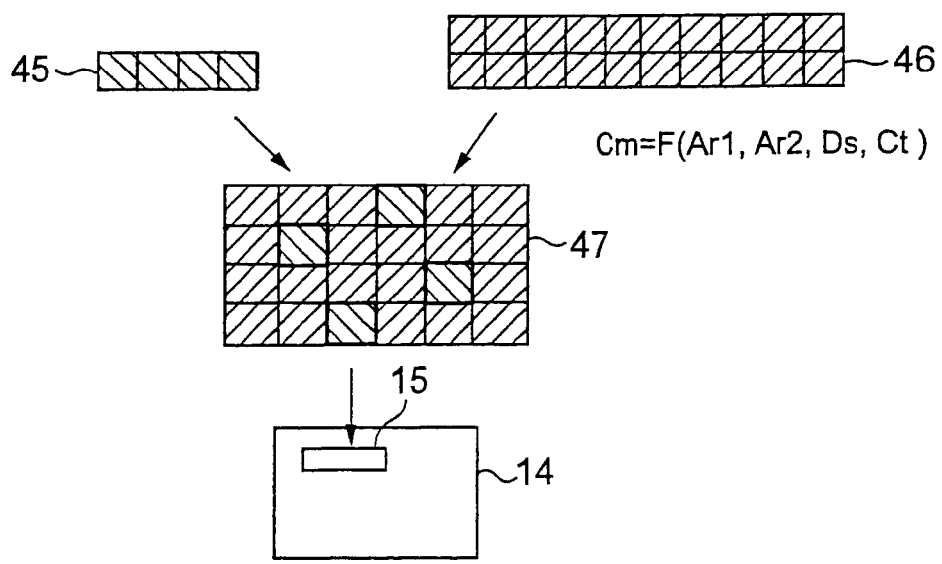
FIG. 3 is a flow diagram for explaining an example of the corporate restoration method of the control program.

FIG. 3 shows a procedure for restoring the control program by integrating the tally electronic information. When the automobile operating key 20 is loaded on the reader 11, the electronic information elements 45 pre-stored in the writable storage unit 21 in the key as a tally are read out. At the same time, the electronic information elements 46 are read from the storage unit 12 in the electronic control device 10.

The information of these electronic information elements are supplied to the electronic information integration restoration device 13 for restoring the electronic tallies to the original information, and are restored to the original information 47 based on the integration algorithm Cm for making the distribution algorithm Ct, the distribution algorithm Ds, and the arrangement algorithms Ar1, Ar2 pre-stored in the car-mounted storage unit 12 inversely react to the electronic information elements.

The control algorithm 15 contained in the restored electronic information 47 is delivered to the electronic control unit 14, and thus the automobile control is enabled.

Moreover, the integration algorithm Cm may be stored in the storage unit in the key 20 instead of that in the automobile. Also, the algorithm Cm may be distributed to both for storage.

Further, it goes without saying that the control program to be divided into the electronic tallies in this embodiment can be a partial program that performs a part of the functions in the electronic control device.

Furthermore, the tally electronic information can be divided information formed peculiar to an automobile at the time of shipping instead of being formed every time when the driving of the automobile ends. It goes without saying that even when such fixedly divided information is utilized, sufficient safety can be obtained compared with the conventional system.

Moreover, in this embodiment, the electronic information presenting the control program is utilized in a form of electronic tallies, however, the electronic information to which another secrecy protection method is applied can be divided depending on a degree of demand for safety. Needless to say, a division of the information in a primitive state itself is sufficient in some case.

Moreover, as an automobile operating key, a conventional type ignition key with a built-in storage unit and an electronic-signal input/output device can be used. In this case, it goes without saying that the system must be configured so that the ignition cannot be started until the information in the key is integrated with the information in the car-mounted storage unit.

Moreover, both an internal combustion engine and an electric motor may be accepted as an automobile power. Also, the power may be of a hybrid type using the internal combustion engine and the electric motor together.

Further, although the system of the present invention has been explained in automobiles here, it is obvious that the same technical concept is also applicable to other land-running vehicles such as a motorcycle and rolling stock, a ship, an airplane, or the like.

INDUSTRIAL APPLICABILITY OF THE INVENTION

As explained in details in the above, the use of the automobile operating key and the automobile electronic control device in accordance with the present invention makes it impossible to drive the automobile by duplicating the key and stealing the cryptograph, therefore, the automobile is prevented from being stolen and the safe keeping can be assured.

The invention claimed is:

1. An electronic control device for an automobile comprising newly dividing an electronic control program for the automobile into pieces of divisional electronic information when ending driving of the automobile, storing some of the pieces of divisional electronic information in an automobile operating key, storing the remaining pieces of divisional electronic information in a car-mounted electronic control unit, and uniting both divisional electronic information; the electronic control device comprises a reader for reading the divisional electronic information stored in said automobile operating key from said automobile operating key, a car-mounted writable storage unit for recording the divisional electronic information other than that stored in the automobile operating key, and an electronic information integration restoration device for restoring the control program by uniting the divisional electronic information inputted from said automobile operating key by said reader with the divisional electronic information stored in said car-mounted storage unit; wherein the automobile is driven according to the restored control program, and further comprising an electronic tally device for forming more than one of the pieces of divisional electronic information by dividing said electronic control program, and a write device capable of writing the divisional electronic information in said automobile operating key, wherein said electronic control program is divided into pieces of divisional electronic information, making said write device store at least one piece of the divisional electronic information in the key-mounted storage unit provided in the automobile operating key, and making said car-mounted storage unit store therein the remaining of the divisional electronic information.

2. The electronic control device for the automobile as claimed in claim 1, wherein an authenticated drive's information is added to the divisional electronic information.

* * * * *

UNITED STATES PATENT AND TRADEMARK OFFICE
CERTIFICATE OF CORRECTION

| | | |
|---|---|---|
| PATENT NO. | : 7,038,331 B2 | Page 1 of 1 |
| APPLICATION NO. | : 10/471408 | |
| DATED | : May 2, 2006 | |
| INVENTOR(S) | : Yutaka Yasukura | |

It is certified that error appears in the above-identified patent and that said Letters Patent is hereby corrected as shown below:

Please change page 1 at Item (54):

From:
"AUTOMOBILE OPERATING KEY AND ELECTRONIC CONTROL DEVICE DORE AUTOMOBILES"

To: --AUTOMOBILE OPERATING KEY AND ELECTRONIC CONTROL DEVICE FOR AUTOMOBILES--

Please change column 1, lines 1-3:

From:
"AUTOMOBILE OPERATING KEY AND ELECTRONIC CONTROL DEVICE DORE AUTOMOBILES"

To:
--AUTOMOBILE OPERATING KEY AND ELECTRONIC CONTROL DEVICE FOR AUTOMOBILES--

Please change column 6, line 50 (claim 2):

Change "drive's" to --driver's--

Signed and Sealed this

Eighth Day of August, 2006

JON W. DUDAS
*Director of the United States Patent and Trademark Office*